United States Patent
Daimon et al.

(10) Patent No.: US 6,232,466 B1
(45) Date of Patent: May 15, 2001

(54) PROCESS FOR PREPARING TITANYL PHTHALOCYANINE CRYSTAL BY SOLVENT TREATMENT OF AMORPHOUS OR QUASI-AMORPHOUS TITANYL PHTHALOCYANINE

(75) Inventors: Katsumi Daimon; Akihiko Tokida; Katsumi Nukada; Hidemi Nukada; Yasuo Sakaguchi, all of Kanagawa (JP)

(73) Assignee: Fuji Xerox Co., LTD, Tokyo (JP)

( * ) Notice: Subject to any disclaimer, the term of this patent is extended or adjusted under 35 U.S.C. 154(b) by 0 days.

(21) Appl. No.: 07/674,762

(22) Filed: Mar. 19, 1991

(30) Foreign Application Priority Data

Mar. 20, 1990 (JP) .......................................... 2-68090

(51) Int. Cl.$^7$ .................................................. C09B 47/04
(52) U.S. Cl. ............................. 540/141; 430/79; 540/143
(58) Field of Search ..................... 540/141, 143; 430/79, 78

(56) References Cited

U.S. PATENT DOCUMENTS

| | | | |
|---|---|---|---|
| 2,770,629 | 11/1956 | Eastes | 540/141 |
| 3,160,635 | 12/1964 | Knudsen et al. | 540/141 |
| 3,357,989 | 12/1967 | Byrne et al. | 540/141 |
| 3,708,292 | 1/1973 | Brach et al. | 540/141 |
| 4,239,685 | * 12/1980 | Pigasse | 540/141 |
| 4,664,997 | * 5/1987 | Suzuki et al. | 430/58 |
| 4,898,799 | 2/1990 | Fujimaki et al. | 430/59 |
| 4,994,339 | * 2/1991 | Kinoshita et al. | 430/78 |
| 5,512,674 | * 4/1996 | Nukada et al. | 540/141 |
| 5,776,576 | * 7/1998 | Kimura et al. | 428/64.1 |
| 5,972,551 | * 10/1999 | Miyauchi et al. | 430/78 |

FOREIGN PATENT DOCUMENTS

| | | |
|---|---|---|
| 0180930 | 5/1986 | (EP) . |
| 0337476 | 10/1989 | (EP) . |

OTHER PUBLICATIONS

Derwent Abstract C88–030128, New Pthalocyanine Crystal Preparation (Jan. 28, 1988).*
JPA–50–38543, Abstract, Apr. 10, 1975.
JPA–62–67094, Abstract, Mar. 26, 1987.
JPA–63–366, Abstract, Jan. 5, 1988.
JPA–64–17066, Abstract, Jan. 20, 1989.
JPA–1–153757, Abstract, Jun. 15, 1989.
JPA–61–217050, Abstract, Sep. 26, 1986.

* cited by examiner

*Primary Examiner*—Robert H. Harrison
(74) *Attorney, Agent, or Firm*—Finnegan, Henderson, Farabow, Garrett & Dunner, L.L.P.

(57) ABSTRACT

A process for preparing a stable titanyl phthalocyanine crystal showing at least one diffraction peak at a Bragg angle ($2\theta \pm 0.2$) of 27.3° is disclosed, which comprises treating amorphous or quasi-amorphous titanyl phthalocyanine with a solvent selected from an alcohol solvent, an aromatic solvent, a mixed solvent of an alcohol solvent and an aromatic solvent, or a mixed solvent of an alcohol solvent and water. The resulting titanyl phthalocyanine exhibits high photosensitivity and excellent durability as a photoconductive material of an electrophotographic photoreceptor.

13 Claims, 4 Drawing Sheets

PROCESS FOR PREPARING TITANYL PHTHALOCYANINE CRYSTAL BY SOLVENT TREATMENT OF AMORPHOUS OR QUASI-AMORPHOUS TITANYL PHTHALOCYANINE

FIELD OF THE INVENTION

This invention relates to a process for preparing a titanyl phthalocyanine crystal useful as a photoconductive material.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

In general, phthalocyanine compounds are known to show several different crystal forms depending on the process of production or the process of treatment. The difference in crystal form is known to have a great influence on their photoelectric conversion characteristics. For example, known crystal forms of copper phthalocyanine compounds include $\alpha$-, $\epsilon$-, $\pi$-, $\chi$-, $\rho$-, and $\delta$-forms in addition to a stable $\beta$-form. It is known that these crystal forms are capable of interconversion by mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, a relationship between the crystal form of copper phthalocyanine and electrophotographic sensitivity is described in JP-A-50-38543 (the term "JP-A" as used herein means an "unexamined published Japanese patent application").

With respect to titanyl phthalocyanine, too, various crystal forms have been proposed, including a stable $\beta$-form as disclosed in JP-A-62-67094, an $\alpha$-form as disclosed in JP-A-61-217050, and other crystal forms as disclosed in JP-A-63-366, JP-A-63-20365, JP-A-64-17066, and JP-A-1-153757.

However, any of the above-described phthalocyanine compounds proposed to date is still unsatisfactory in photosensitivity and durability when used as a photosensitive material. It has thus been demanded to develop a phthalocyanine compound of new crystal form or a process for easily preparing a phthalocyanine compound of stable crystal form.

SUMMARY OF THE INVENTION

An object of the present invention is to provide a process for preparing a stable titanyl phthalocyanine crystal having high photosensitivity.

As a result of extensive investigations, the inventors have found that a titanyl phthalocyanine crystal having a stable crystal form which exhibits high sensitivity and durability as a photoconductive material can be obtained by subjecting amorphous or quasi-amorphous titanyl phthalocyanine to a simple treatment, and thus reach the present invention.

The present invention relates to a process for preparing a stable titanyl phthalocyanine crystal showing at least one diffraction peak at a Bragg angle (2θ±0.2) of 27.3°, which comprises treating amorphous or quasi-amorphous titanyl phthalocyanine with an alcohol solvent, an aromatic solvent, a mixed solvent of an alcohol solvent and an aromatic solvent, or a mixed solvent of an alcohol solvent and water.

The titanyl phthalocyanine crystal prepared by the process of the present invention is useful as a photoconductive material of an electrophotographic photoreceptor.

DETAILED DESCRIPTION OF THE INVENTION

Figure 1:
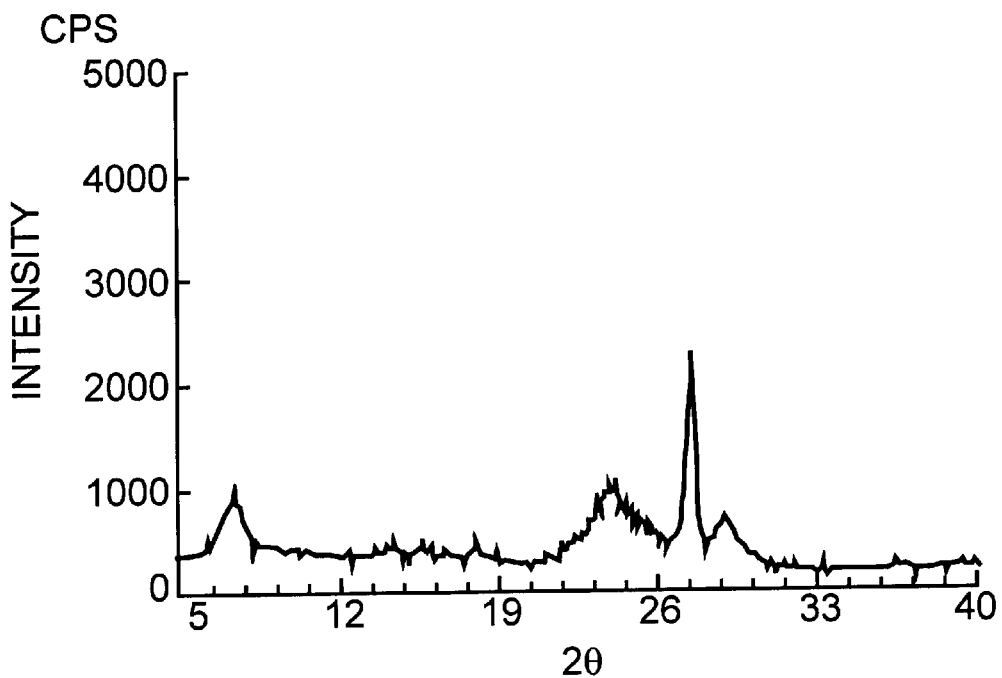
FIGS. 1 through 4 each shows an X-ray diffraction pattern (abscissa: Bragg angle (2θ); ordinate: intensity (CPS)) of the titanyl phthalocyanine crystals obtained in Examples 1, 2, 3, and 4, respectively.

In preparation of amorphous or quasi-amorphous titanyl phthalocyanine for use in the present invention, titanyl phthalocyanine which is synthesized by a known method as described in U.S. Pat. Nos. 4,664,997 and 4,898,799 is used. For example, it is synthesized by reacting 1,3-diiminoisoindoline with titanium tetrabutoxide, or by reacting 1,2-dicyanobenzene (o-diphthalonitrile) with a titanium compound as shown in the following scheme (1) or (2).

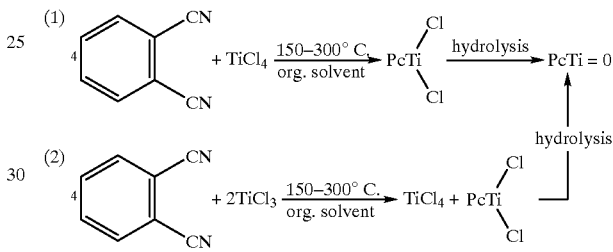

In the scheme, Pc represents a phthalocyanine residue. Namely, 1,2-dicyanobenzene and a titanium halide are heated in an inert solvent to react. Examples of the titanium halide include titanium tetrachloride, titanium trichloride, and titanium tetrabromide, with titanium tetrachloride being preferably used in view of production costs. As an inert solvent, organic solvents having a high boiling point are preferably used, such as trichlorobenzene, α-chloronaphthalene, β-chloronaphthalene, α-methylnaphthalene, methoxynaphthalene, diphenyl ether, diphenylmethane, diphenylethane, ethylene glycol dialkyl ethers, diethylene glycol dialkyl ethers, triethylene glycol dialkyl ethers and the like. The reaction is generally performed at 150 to 300° C. and preferably at 180 to 250° C. After the reaction, the produced dichlorotitanium phthalocyanine is separated by filtration and washed with a solvent as used in the reaction to remove by-products and unreacted starting materials. Then, the resulting product is washed with an inert solvent such as alcohols (e.g., methanol, ethanol, and isopropyl alcohol) and ethers (e.g., tetrahydrofuran and 1,4-dioxane) to remove the solvent which has been used in the reaction and in the subsequent washing step. The resultant is then subjected to hydrolysis with hot water to obtain titanyl phthalocyanine.

Titanyl phthalocyanine as synthetically prepared above is poured into 1 to 100 times (preferably from 3 to 60 times) of its weight of concentrated sulfuric acid having a concentration of from 70 to 100% (preferably from 90 to 97%) at a temperature of from −20° to 100° C. (preferably from 0° to 60° C.) to form a solution or a slurry. The resulting solution or slurry is then poured into 2 to 50 times (preferably 5 to 20 times) of its volume of water at a temperature of from 0° to 50° C. (preferably 10° C. or lower)

to precipitate amorphous or quasi-amorphous titanyl phthalocyanine which does not exhibit sharp peaks in its X-ray diffraction pattern.

In the present invention, titanyl phthalocyanine which exhibits a broad peak having a half width value of more than 1 degree at a Bragg angle (2θ) of 6 to 8 degrees in the X-ray diffraction pattern, is defined as "quasi-amorphous titanyl phthalocyanine.

The precipitated amorphous or quasi-amorphous titanyl phthalocyanine is collected by filtration, washed with water, and then treated with an alcohol solvent, an aromatic solvent, a mixed solvent of an alcohol solvent and an aromatic solvent, or a mixed solvent of an alcohol solvent and water. The treatment is effected by pouring the amorphous or quasi-amorphous titanyl phthalocyanine into a selected solvent, followed by stirring at a temperature of from room temperature to 100° C., and preferably from 50° to 100° C., for 1 to 5 hours.

Examples of suitable alcohol solvents are those having up to 5 carbon atoms such as methanol and ethanol. Examples of suitable aromatic solvents are aromatic hydrocarbons such as benzene, toluene, and xylene; aromatic nitro compounds such as nitrobenzene; aromatic halogen compounds such as monochlorobenzene, dichlorobenzene, trichlorobenzene and chloronaphthane; and phenol. In using the mixed solvent as described above, the alcohol solvent/aromatic solvent volume ratio is from 99/1 to 1/99 and preferably from 90/10 to 70/30, and the alcohol solvent/water volume ratio is from 99/1 to 10/90, and preferably from 99/1 to 40/60.

The amount of the solvent to be used in the treatment ranges from 1 to 100 times, and preferably from 5 to 50 times, the weight of titanyl phthalocyanine to be treated.

After the treatment, the crystals are collected by filtration and washed with methanol and water to obtain desired titanyl phthalocyanine crystals.

The titanyl phthalocyanine crystal of the present invention which is useful as a photoconductive material has a stable crystal form showing at least one clear diffraction peak at a Bragg angle (2θ±0.2) of 27.3°. Since it has photosensitivity in a wavelength region extending to the longer side, it is very useful as a photoconductive material of an electrophotographic photoreceptor of, for example, a printer utilizing a semi-conductor laser as a light source.

The present invention is now illustrated in greater detail with reference to Examples, but it should be understood that the present invention is not deemed to be limited thereto. All the parts, percents and ratios are by weight unless otherwise indicated.

SYNTHESIS EXAMPLE

Synthesis of Titanyl Phthalocyanine

To 20 parts of 1-chloronaphthalene were added 3 parts of 1,3-diiminoisoindoline and 1.7 part of titanium tetrabutoxide, and the mixture was allowed to react at 190° C. for 5 hours. The reaction product was collected by filtration and washed with aqueous ammonia, water, and acetone to obtain 4.0 parts of titanyl phthalocyanine.

Figure 5:
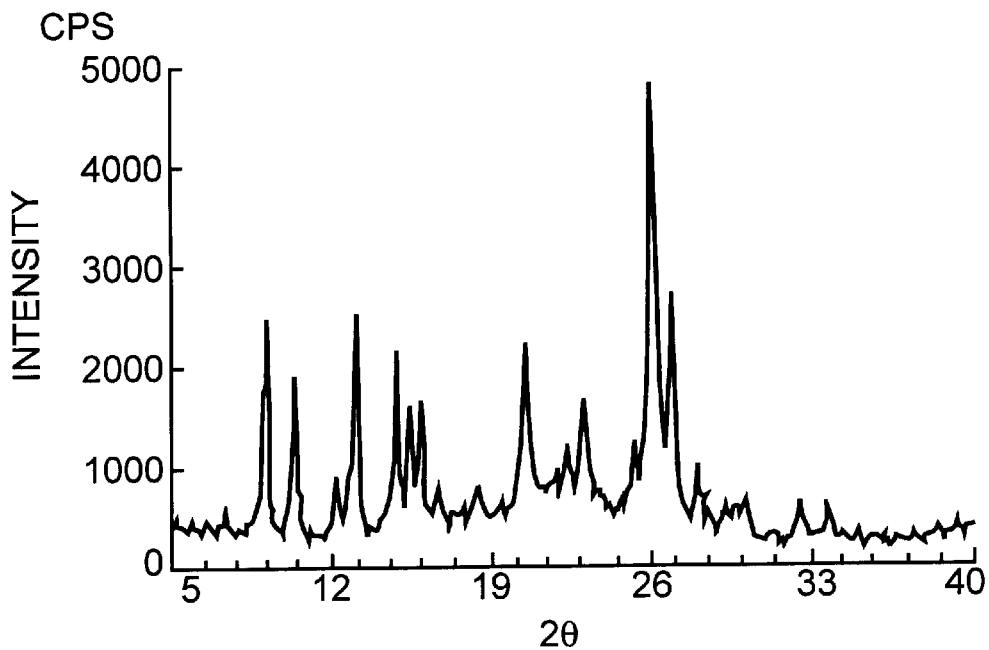
FIG. 5 is an X-ray diffraction pattern of the titanyl phthalocyanine crystal obtained in the Synthesis Example.

A powder X-ray diffraction pattern of the resulting titanyl phthalocyanine crystal is shown in FIG. 5.

EXAMPLE 1

Two parts of the titanyl phthalocyanine obtained in the Synthesis Example were dissolved in 100 parts of 97% sulfuric acid, and the solution was poured into 1300 parts of ice-water. The precipitated titanyl phthalocyanine was collected by filtration, washed successively with dilute aqueous ammonia and water, and dried to obtain 1.6 parts of amorphous titanyl phthalocyanine.

Figure 6:
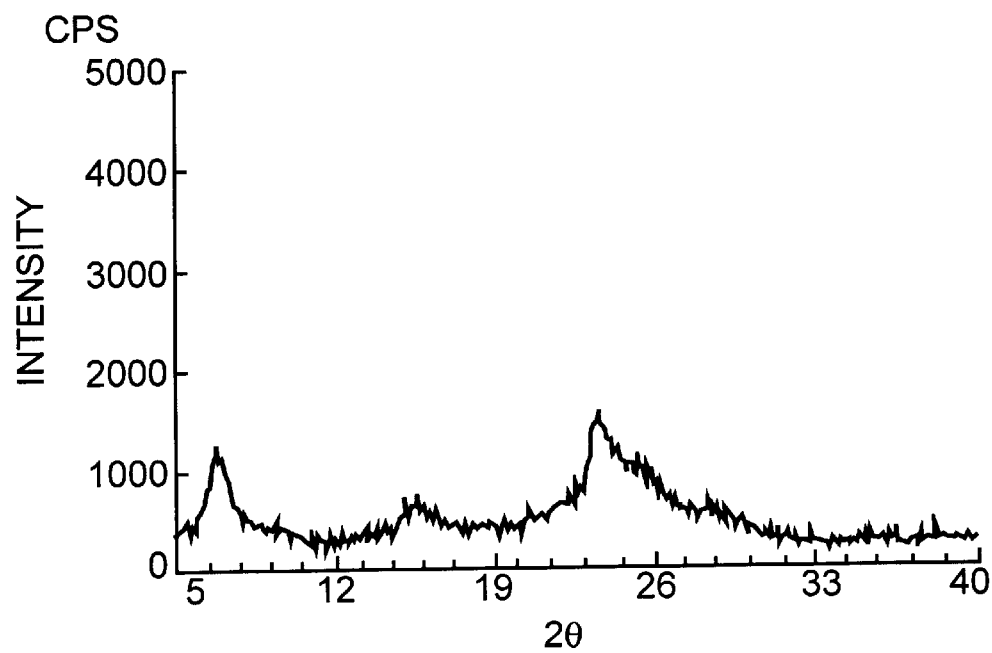
FIGS. 6 and 7 each shows an X-ray diffraction patterns of the amorphous titanyl phthalocyanine used as a starting material in Examples 1 and 2, respectively.

A powder X-ray diffraction pattern of the resulting titanyl phthalocyanine powder is shown in FIG. 6.

One part of the resulting titanyl phthalocyanine powder was stirred in 25 parts of methanol at 50° C. for 2 hours, followed by filtration. The solid was washed with methanol to recover 0.9 part of a crystal. An X-ray diffraction pattern of the resulting crystal is shown in FIG. 1.

EXAMPLE 2

Figure 7:
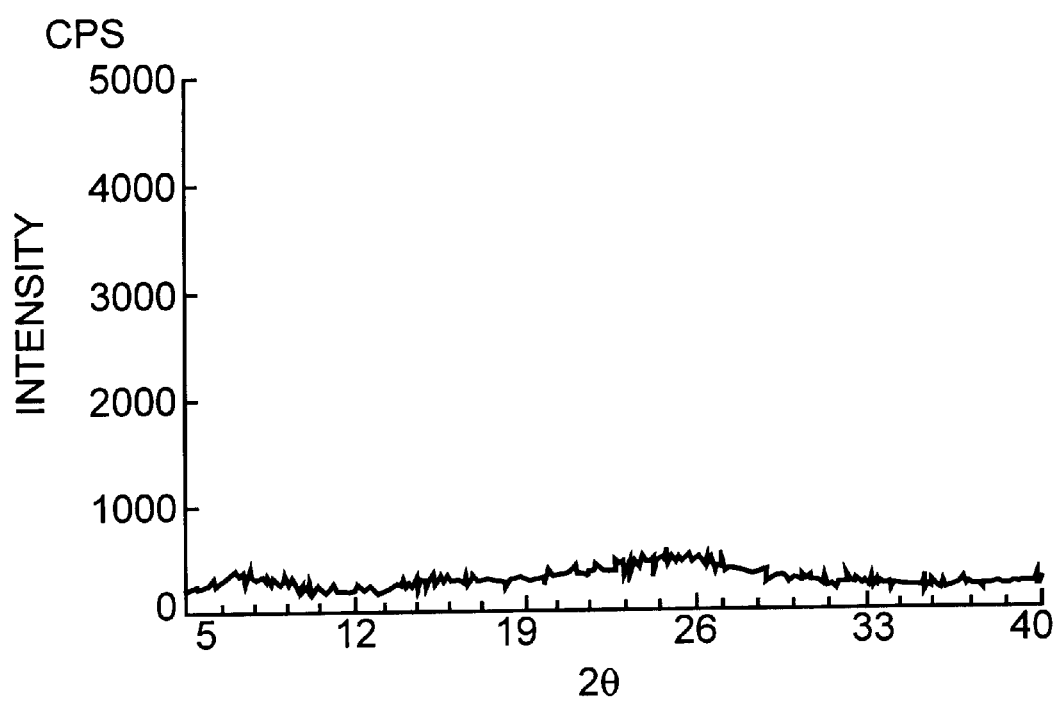

Two parts of the titanyl phthalocyanine crystal obtained in the Synthesis Example were dissolved in 20 parts of 97% sulfuric acid at 5° C., and the solution was poured into 250 parts of ice-water. The formed titanyl phthalocyanine precipitate was filtered, washed successively with methanol, dilute aqueous ammonia, and water, and dried to obtain 1.5 parts of amorphous titanyl phthalocyanine. A powder X-ray diffraction pattern of the resulting titanyl phthalocyanine powder is shown in FIG. 7.

Figure 2:
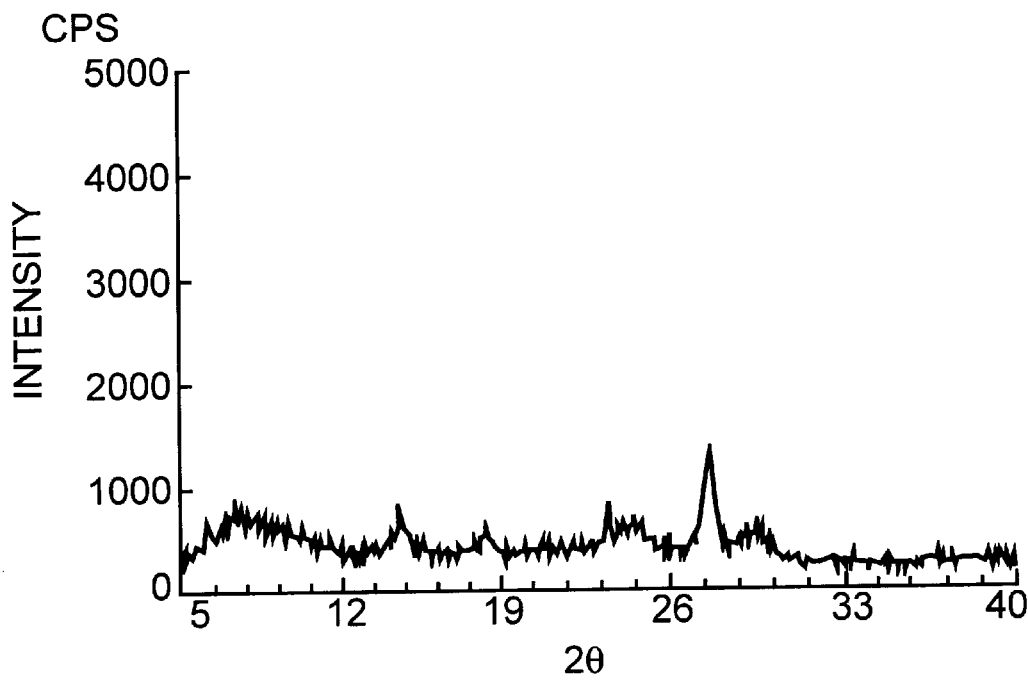

One part of the resulting titanyl phthalocyanine powder was stirred in 25 parts of methanol at 50° C. for 2 hours, followed by filtration. The solid was washed with methanol to obtain 0.9 part of a crystal. An X-ray diffraction pattern of the resulting crystal is shown in FIG. 2.

EXAMPLE 3

Figure 3:
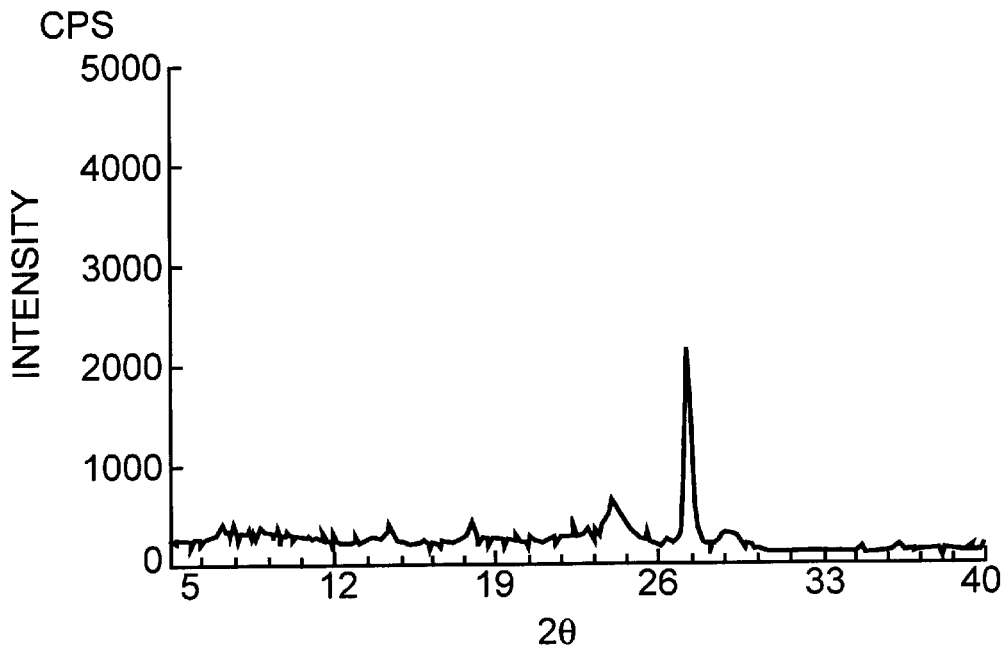

The same procedures as in Example 1 were repeated, except for replacing 25 parts of methanol with 25 parts of phenol, to obtain 0.9 part of a titanyl phthalocyanine crystal. An X-ray diffraction pattern of the resulting crystal is shown in FIG. 3.

EXAMPLE 4

Figure 4:
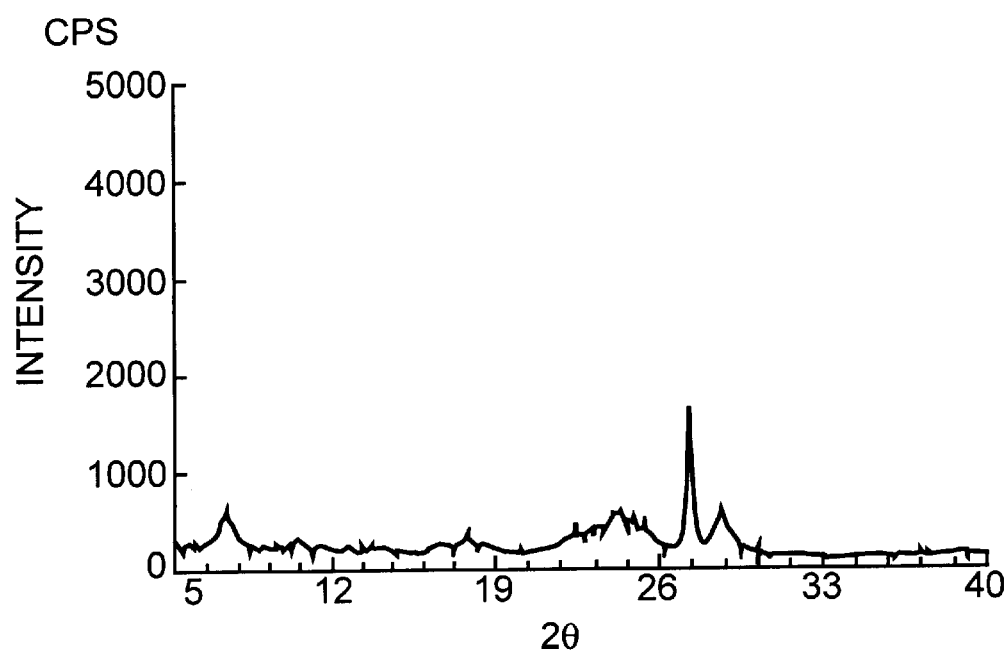

The same procedures as in Example 1 were repeated, except for replacing 25 parts of methanol with a mixed solvent consisting of 10 parts of methanol and 1 part of monochlorobenzene, to obtain 0.9 part of a titanyl phthalocyanine crystal. An X-ray diffraction pattern of the resulting crystal is shown in FIG. 4.

APPLICATION EXAMPLE

One part of the titanyl phthalocyanine crystal obtained in Example 1 was mixed with 1 part of polyvinyl butyral ("ESLEC BM-1", produced by Sekisui Chemical Co., Ltd.) and 100 parts of cyclohexanone, and the mixture was dispersed in a paint shaker together with glass beads for 1 hour. The resulting coating composition was coated on an aluminum support by dip coating and dried by heating at 100° C. for 5 minutes to form a 0.2 µm-thick charge generating layer.

In 20 parts of monochlorobenzene were dissolved 2 parts of a compound of formula:

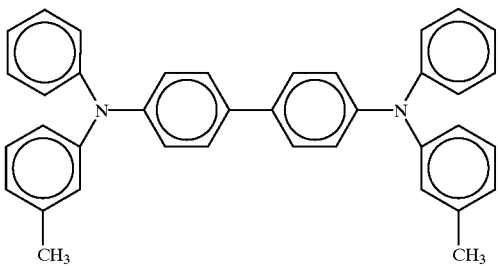

and 3 parts of poly(4,4-cyclohexylidenediphenyl-enecarbonate) of formula:

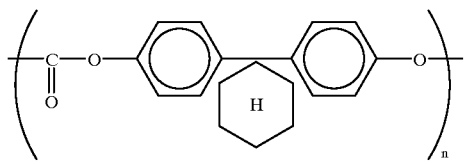

and the resulting coating composition was coated on the charge generating layer by dip coating and dried by heating at 120° C. for 1 hour to form a 20 μm-thick charge transporting layer.

The resulting electrophotographic photoreceptor was charged to −6 kV with a corona discharge in an ambient-temperature and ambient-humidity condition (20° C., 50% RH) by means of an electrostatic copying paper analyzer ("EPA-8100" manufactured by Kawaguchi Denki K.K.) and then exposed to monochromatic light (800 nm) isolated from light emitted from a tungsten lamp by a monochromator at an irradiance of 1 μW/cm$^2$. The exposure amount $E_{1/2}$ (erg/cm$^2$) required for the surface potential to be reduced to ½ the initial surface potential $V_0$ (V) was measured. Then, the photoreceptor was irradiated with tungsten light of 10 lux for 1 second, and a residual potential $V_R$ was measured. Further, the above-described charging and exposure were repeated 1000 times, and the same measurements of $V_0$, $E_{1/2}$, and $V_R$ were made. As a result, $V_0$=−820 V; $E_{1/2}$=1.3 erg/cm$^2$; and $V_R$=0 V. After the 1,000-time repetition of charging and exposure, $V_0$=−810 V; $E_{1/2}$=1.3 erg/cm$^2$; and $V_R$=0 V.

REFERENCE EXAMPLE

For comparison, an electrophotographic photoreceptor was prepared in the same manner as in Application Example, except for using the titanyl phthalocyanine crystal having a powder X-ray diffraction pattern of FIG. 5 as obtained in the Synthesis Example as a charge generating material. The comparative photoreceptor was evaluated in the same manner as in the Application Example. As a result, $V_0$=−780 V; $E_{1/2}$=4.1 erg/cm$^2$; and $V_R$=10 V. After the 1,000-time repetition of charging and exposure, $V_0$=−750 V; $E_{1/2}$=3.8 erg/cm$^2$; and $V_R$=15 V. The comparative photoreceptor thus proved inferior to that prepared in the Application Example.

As described above, according to the present invention, a stable crystal of titanyl phthalocyanine showing at least one diffraction pattern at a Bragg angle (2θ±0.2) of 27.3° can be obtained with ease through a very simple operation. The titanyl phthalocyanine crystal obtained by the present invention is very useful as a photoconductive material of electrophotographic photoreceptors used in printers utilizing a semiconductor laser as a light source. The electrophotographic photoreceptors using the titanyl phthalocyanine crystal of the present invention exhibit high sensitivity and excellent durability on repeated use.

While the invention has been described in detail and with reference to specific examples thereof, it will be apparent to one skilled in the art that various changes and modifications can be made therein without departing from the spirit and scope thereof.

What is claimed is:

1. A process for preparing a titanyl phthalocyanine crystal showing at least one diffraction peak at a Bragg angle (2θ±0.2) of 27.3; which comprises dissolving titanyl phthalocyanine in concentrated sulfuric acid which is then poured into water to precipitate amorphous or quasi-amorphous titanyl phthalocyanine, and treating said amorphous or quasi-amorphous titanyl phthalocyanine with a solvent, wherein said solvent is an alcohol solvent having up to 5 carbon atoms, an aromatic solvent, a mixed solvent of said alcohol solvent and said aromatic solvent, or a mixed solvent of said alcohol solvent and water; and wherein said aromatic solvent is an aromatic hydrocarbon, an aromatic nitro compound, an aromatic halogen compound or phenol.

2. A process as claimed in claim 1, wherein said treating is performed at a temperature of from room temperature to 100° C. for a period of from 1 to 5 hours.

3. A process as claimed in claim 1, wherein said solvent is used in an amount of from 1 to 100 times the weight of titanyl phthalocyanine.

4. A process as claimed in claim 1, wherein said alcohol solvent is methanol or ethanol.

5. A process as claimed in claim 1, wherein said aromatic solvent is benzene, toluene, xylene, nitrobenzene, monochlorobenzene, dichlorobenzene, trichlorobenzene, chloronaphthalene, or phenol.

6. A process as claimed in claim 1, wherein said mixed solvent of said alcohol solvent and said aromatic solvent has the volume ratio of said alcohol solvent to said aromatic solvent of from 99/1 to 1/99.

7. A process as claimed in claim 1, wherein said mixed solvent of said alcohol solvent and water has the volume ratio of the said alcohol solvent to water of from 99/1 to 10/90.

8. The process of claim 1, wherein said treating comprises pouring said amorphous or quasi-amorphous titanyl phthalocyanine into said solvent followed by stirring at a temperature of from room temperature to 100° C. for 1 to 5 hours.

9. The process of claim 3 further comprising pouring said amorphous or quasi-amorphous titanyl phthalocyanine into said solvent followed by stirring at a temperature of from room temperature to 100° C. for 1 to 5 hours.

10. The process of claim 4 further comprising pouring said amorphous or quasi-amorphous titanyl phthalocyanine into said solvent followed by stirring at a temperature of from room temperature to 100° C. for 1 to 5 hours.

11. The process of claim 5 further comprising pouring said amorphous or quasi-amorphous titanyl phthalocyanine into said solvent followed by stirring at a temperature of from room temperature to 100° C. for 1 to 5 hours.

12. The process of claim 6 further comprising pouring said amorphous or quasi-amorphous titanyl phthalocyanine into said solvent followed by stirring at a temperature of from room temperature to 100° C. for 1 to 5 hours.

13. The process of claim 7 further comprising pouring said amorphous or quasi-amorphous titanyl phthalocyanine into said solvent followed by stirring at a temperature of from room temperature to 100° C. for 1 to 5 hours.

* * * * *